United States Patent [19]

Smith

[11] Patent Number: 5,199,660

[45] Date of Patent: Apr. 6, 1993

[54] RIBBED-BELT FOR BELT-DRIVEN TAPE PACK

[75] Inventor: David P. Smith, Hudson, Wis.

[73] Assignee: Minnesota Mining and Manufacturing Company, St. Paul, Minn.

[21] Appl. No.: 862,411

[22] Filed: Apr. 2, 1992

[51] Int. Cl.⁵ .............................................. G03B 1/04
[52] U.S. Cl. .................................. 242/192; 242/75.1; 474/260; 226/171
[58] Field of Search ............... 242/192, 75.1; 474/237, 474/260, 261, 264, 252, 249; 226/170, 171, 172

[56] References Cited

U.S. PATENT DOCUMENTS

| | | | |
|---|---|---|---|
| 1,592,416 | 7/1926 | Brownell | 474/252 |
| 1,635,363 | 7/1927 | Haudley et al. | 474/249 |
| 1,955,813 | 4/1934 | Klarpenecker | 226/171 |
| 2,031,565 | 2/1936 | Kramp | 474/252 |
| 2,548,135 | 4/1951 | Worley | 474/252 |
| 3,692,255 | 9/1972 | Von Behren | 242/192 |
| 3,942,743 | 3/1976 | Jinsenji | 242/192 |
| 4,146,194 | 3/1979 | Majicek | 242/192 |
| 4,342,809 | 8/1982 | Newell | 242/192 |
| 4,422,598 | 12/1983 | Groenewegen et al. | 474/237 |
| 4,466,564 | 8/1984 | Smith et al. | 226/170 |
| 4,688,742 | 8/1987 | Hettich | 242/192 |

OTHER PUBLICATIONS

D. P. Smith and R. A. Von Behren, "Squeeze-Film Analysis of Tape Winding Effects in Data Cartridge," *Tribology and Mechanics of Magnetic Storage Systems*, vol. VI, Oct. 1989.

*Primary Examiner*—Thomas B. Will
*Attorney, Agent, or Firm*—Gary L. Griswold; Walter N. Kirn; Eric D. Levinson

[57] ABSTRACT

A thin, continuous, flexible drive belt for a belt-driven data cartridge. The belt has a rectangular rib which extends longitudinally along the center of the face of the belt that contacts a tape pack contained within the cartridge. The ribbed belt allows the tape pack to operate at greater transport speeds and acceleration rates by creating a pair of air channels extending the full length of the contact area between the belt and tape pack, resulting in effective removal of air at the belt/tape pack interface.

14 Claims, 2 Drawing Sheets

RIBBED-BELT FOR BELT-DRIVEN TAPE PACK

FIELD OF THE INVENTION

The present invention concerns an improved belt for a belt-driven recording tape pack such as that disclosed in U.S. Pat. No. 3,692,255 (Von Behren).

BACKGROUND OF THE INVENTION

In the cartridge of the Von Behren patent, magnetic recording tape is driven by a thin, continuous, flexible, pretensioned belt which in turn is driven by a single reversible drive motor that provides rapid acceleration and deceleration of the recording tape in either direction. In such a cartridge, pressure is exerted by the belt on the tape pack over an extended area, and the pressure arises solely from the tension in the belt.

Since the development of the belt-driven cartridge by Von Behren in 1972, there has been a continuing effort to develop cartridges which have a higher storage capacity than that of the original Von Behren cartridge. The cartridge of the Von Behren patent operated at tape transport speeds of about 30 in/sec (76 cm/sec) with a linear recording density of about 1600 flux reversals per inch (630 per cm), and a total storage capacity of about 3 Megabytes. By the early 1980s the total storage capacity had been expanded to 67.5 Megabytes (formatted) by using a thinner tape (which increases the amount of the tape that will fit in a cartridge), a tape speed of 90 in/sec (230 cm/sec), and a recording density of 10,000 flux reversals per inch (3,900 per cm). This new tape had a much finer surface texture than the old tape, in which average surface asperities were about 22 nm, compared with over 100 nm for the old tape. The higher tape speeds and recording densities of the newer tapes required intimate tape-to-head contact and improved uniformity of tape speed to avoid data handling errors. Intimate tape-to-head contact requires uniform tape tension, which in turn requires good contact between the drive belt and tape pack.

In 1984, a new textured drive belt having a microscopically rough surface was disclosed in U.S. Pat. No. 4,466,564 (Smith). The textured belt surface provided for better traction at the belt/tape interface, enabling higher and more stable tape tension at increased tape speeds. The textured belt allowed air molecules to rapidly escape from between the belt and tape during high speed tape winding. This reduced hydrodynamic "lift-off," much like ordinary tread on an automobile tire prevents hydroplaning on wet highways.

Since 1984, the effort to increase the storage capacity of data cartridges has continued. Today's data cartridges have a total storage capacity in excess of a Gigabyte (formatted), a tape speed of 120 in/sec (305 cm/sec) and a recording density of 50,000 flux reversals per inch (20,000/cm).

The data cartridges of tomorrow are expected to have tape with a surface texture in which average surface asperities are less than about 10 nm. This smoother tape will require even better contact between the drive belt and tape pack. Data transfer rates could be increased by increasing tape speed beyond 120 in/sec (305 cm/sec). Similarly, access time to read any file on the cartridge could be decreased by searching the tape at higher speeds.

Increased tape speed will generally result in higher tape acceleration and deceleration rates when the cartridge is used in the start-stop mode. If a computer is unable to read data on a tape at the same rate that the tape is traveling, the computer may store the data in a buffer until it catches up with the tape. However, once the buffer is full, it is necessary to stop the tape. This usually necessitates reversing the tape direction to return to the portion of the tape where the buffer filled up. If the belt is unable to maintain tape tension during rapid decelerations, the tape will continue to unravel from the tape pack due to the inertia of the tape pack, even though the belt has stopped its rotation of the tape hubs. This condition may lead to tape spilling out from the data cartridge and subsequent cartridge destruction. While today's tapes are subjected to accelerations of about 1,500 in/sec$^2$ (3,800 cm/sec$^2$), the tapes of the future may be subjected to acceleration rates as high as 3,000 in/sec$^2$ (7,600 cm/sec$^2$).

Thus, the cartridges of the future may require smoother tapes, faster transport speeds, and faster acceleration rates. It would be desirable to have a drive belt which provides greater tape tension than currently available belts for tape transport speeds exceeding 120 in/sec (305 cm/sec) at an acceleration of 3,000 in/sec$^2$ (7,600 cm/sec$^2$).

SUMMARY OF THE INVENTION

The present invention is a thin, continuous, flexible data cartridge drive belt, wherein the belt has a single raised portion which extends longitudinally along the center of the face of the belt that contacts a tape pack contained within a data cartridge. In one embodiment, the raised portion is a raised rib and has a width of about one-third of the width of the face of the belt.

In another embodiment, the present invention includes a pair of thin, continuous, flexible data cartridge drive belts, including a first and second belt, wherein the first belt is narrower than the second belt and extends longitudinally along the center of the face of the second belt that contacts a tape pack contained within a data cartridge. In one embodiment, the width of the face of the first belt is about one-third the width of the face of the second belt.

In yet another embodiment, the present invention is a belt-driven tape pack, including a pair of hubs on which is wound a length of tape, and the drive belts described above entrained around a drive roller, a pair of guide rollers, and a tape pack.

The data cartridge drive belt of the present invention assures adequate tape tension by increasing the interfacial pressure applied to the tape pack by providing macroscopic air channels extending the full length of the belt which facilitate the removal of air at the belt-/tape pack interface. As a result, the belt of the present invention provides for increased levels of transient tape tension at a tape transport acceleration of 3,000 in/sec$^2$ (7,600 cm/sec$^2$) to tape transport speeds in excess of 120 in/sec (305 cm/sec).

DETAILED DESCRIPTION OF THE PREFERRED EMBODIMENTS

Figure 1:
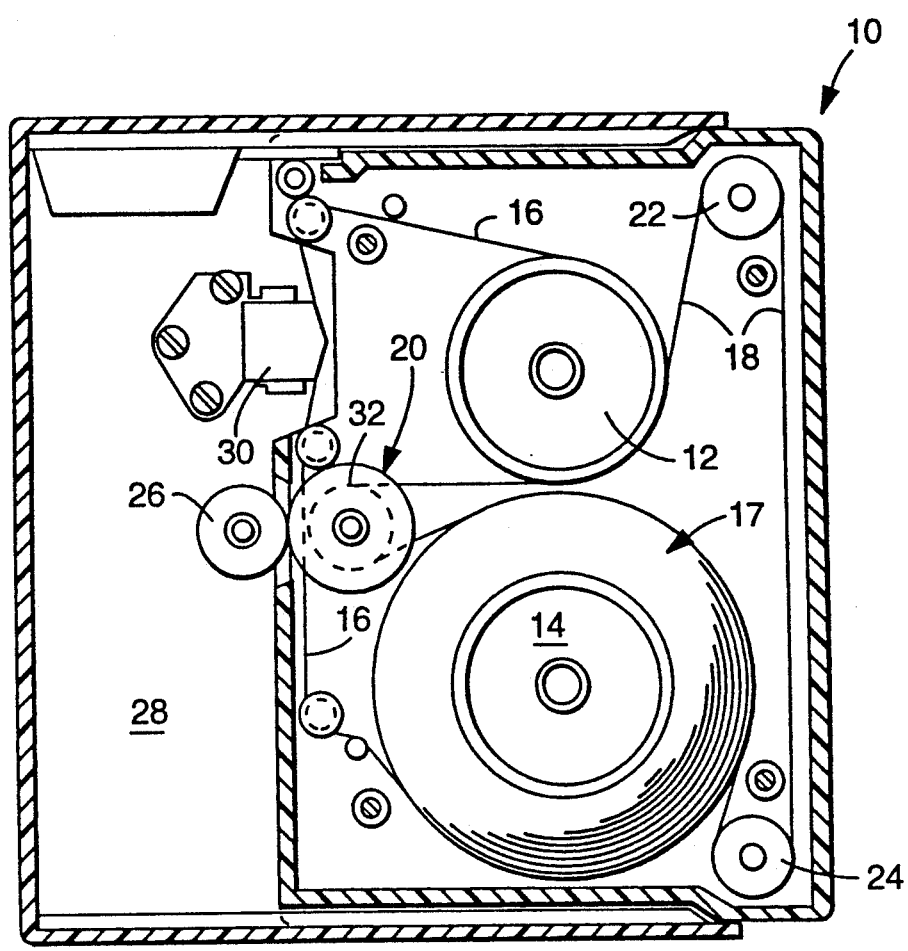
FIG. 1 is a schematic representation of a belt-driven data cartridge according to the prior art.

A cartridge 10 according to the prior art is shown in a tape deck 28 in FIG. 1. Cartridge 10 has a pair of hubs 12 and 14 on which is wound a length of magnetic recording tape 16. A drive belt 18 is entrained or wound around a belt drive roller 20, a pair of belt guide rollers 22 and 24, and tape pack 17 formed by the portion of tape 16 wound around hubs 12 and 14. When cartridge 10 is moved into operative position in tape deck 28 as shown in FIG. 1, drive puck 26 of tape deck 28 contacts belt-drive roller 20, and magnetic recording head 30 of deck 28 contacts tape 16. The belt-contacting portion 32 of belt drive roller 20 is recessed to permit tape 16 to pass without touching roller 20.

Figure 2:
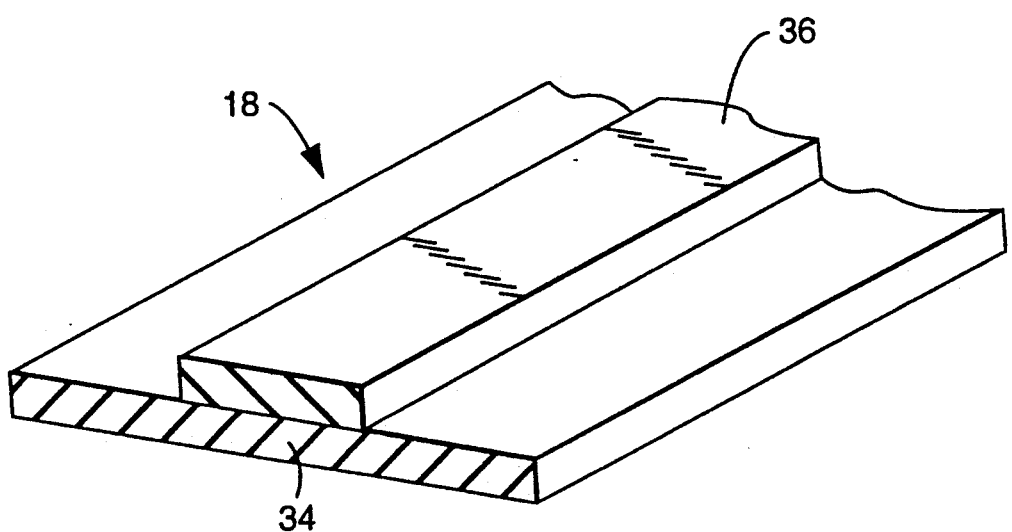
FIG. 2 is a perspective view of a section of a drive belt according to one embodiment of the present invention.

A drive belt 18 according to one embodiment of the present invention is shown in FIG. 2. Drive belt 18 is comprised of two separate belts 34 and 36 which do not move with respect to each other. Belt 36 is narrower than belt 34 and extends longitudinally along the center of a face of belt 34, thereby forming a "rib" on belt 34. Belt 34 may be any known drive belt, and is preferably thin, continuous, and flexible, such as the belts disclosed in U.S. Pat. Nos. 3,692,255 and 4,466,564. Rib (or belt) 36 is also continuous and flexible, but is narrower than belt 34.

Belt 34 may be made from a ring of polyurethane film having a thickness of about 6–7 mils (0.15–0.18 mm), an outside diameter of about 4.6 cm and width of about 7 mm. Rib 36 may be made from a ring of polyurethane film having a thickness of 6–7 mils (0.15–0.18 mm), an outer diameter of about 3.2 cm, and a width of about 2.5 mm. These polyurethane rings may be stretched and distorted into cylindrical belts which are positioned in cartridge 10.

Composite drive belt 18 is comprised of belt 34 and rib 36, wherein stretched belt 34 has a width of about 4 mm and a thickness of about 3 mils (0.08 mm), and stretched rib 36 has a width of about one-third of stretched belt 34, and a thickness of about 3 mils (0.08 mm). As utilized in a standard ¼" (6.3 mm) data cartridge, belt 34 and rib 36 are stretched to a length of about 17 inches (43 cm).

Belt 34 and rib 36 need not be bonded together in any way in order to prevent movement or slippage of rib 36 with respect to belt 34. However, it may be desirable to physically or chemically bond the larger and smaller polyurethane rings described above so that 34 and rib 36 can be stretched to form composite belt 18 in a single stretching process.

Figure 3:
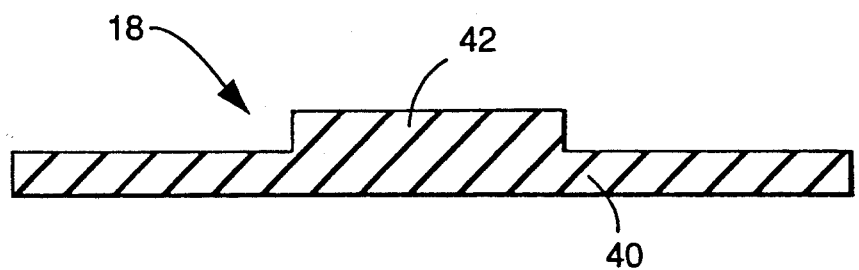
FIG. 3 is a cross-sectional view of a drive belt according to another embodiment of the present invention.

In another embodiment of the invention, shown in FIG. 3, belt 18 is comprised of a single belt 40 having a raised portion which extends longitudinally along the center of a face of belt 40, thereby forming a raised rectangular rib 42 on belt 40. Belt 40 may be made by forming, as opposed to stamping, a ring of material having a raised central rib via known casting or molding techniques. Subsequent distortion by stretching, as discussed above, provides a belt 40 having a rib 42, as shown in FIG. 3. Rib 42 preferably has about the same thickness as belt 40, and its width is preferably about one-third of the width of belt 40.

Figure 5:
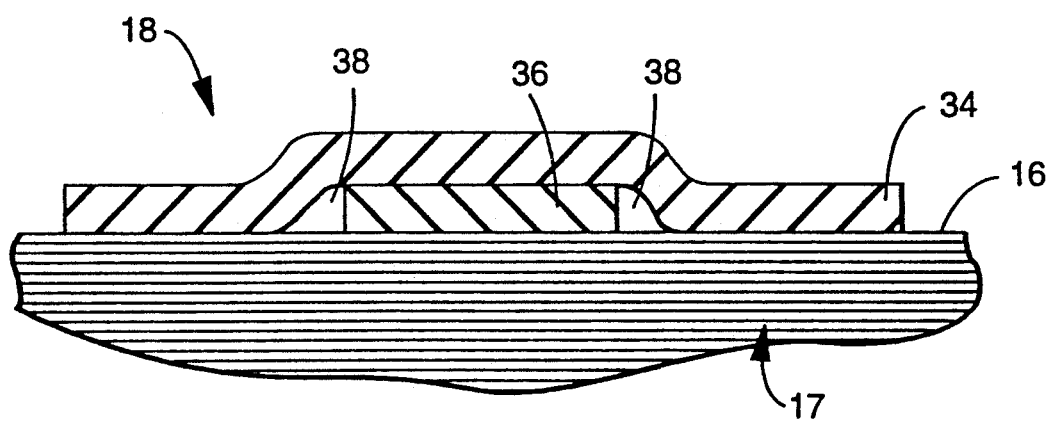
FIG. 5 is a cross-sectional representation of a drive belt according to the present invention in contact with a tape pack taken along 5—5 of FIG. 4.

Composite belt 18, comprised of belt 34 and rib 36, is shown pressing against tape pack 17 having layers of tape 16 in FIG. 5. Rib 36 directly contacts the outer layer of tape pack 17. As belt 34 bears against and attempts to conform to the outer layer of tape pack 17, the presence of interposed rib 36 results in the formation of macroscopic air channels 38.

Air channels 38 extend the entire length of the face of belt 18 that contacts tape pack 17 and facilitate the release of air from between the belt and tape pack. The manner in which belt 34 wraps around a rib 36 as a particular segment of composite belt 18 travels around tape pack 17 is shown schematically in FIG. 4. As a particular segment of belt 18 approaches tape pack 17, the first part of that segment of belt 18 to contact tape pack 17 is rib 36. Next, belt 34 begins to wrap around belt 36, forcing the air between belt 34 and tape pack 17 either away from the path of belt 34 or into air channels 38.

Rib 36 also facilitates the removal of air from between the layers of tape 16 in tape pack 17 by "squeezing" air out from the center of the layers of tape 16 toward the sides of the layers of tape 16, and thus out of the tape pack. This increases the precision with which tape 16 is wound on tape pack 17, which may increase the data reliability of the tape pack. This phenomenon is discussed in "Squeeze Film Analysis of Tape Winding Effects in Data Cartridge" by D.P. Smith and R.A. Von Behren, Tribology and Mechanics of Magnetic Storage Systems, Volume VI, October 1989, pp. 88–92.

Composite belt 18 provides for increased levels of interfacial pressure thereby providing substantially enhanced transient tape tension at an acceleration of 3,000 in/sec$^2$ (7,600 cm/sec$^2$) to tape speeds in excess of 120 in/sec (305 cm/sec). It is believed that the air channels 38 provided by belt 18 serve to facilitate the removal of entrapped air from the space between belt 18 and tape pack 17, thereby enabling proper tape windup during accelerations exceeding 3,000 in/sec$^2$ (7,600 cm/sec$^2$).

TAPE TENSION TESTS

In a tape drive for a standard ¼" (6.3 mm) data cartridge, the magnetic recording head was replaced by a device for sensing tension in a magnetic recording tape. Comparative tests were performed using the embossed belt of U.S. Pat. No. 4,466,564 and the ribbed belt as shown in FIG. 2 of the present invention. The tension in the prior art embossed belt was 16.4 ounces (4.6 newtons), while the tension in the ribbed belt of the present invention was 12.4 ounces (3.4 newtons). The ribbed belt was used intentionally at a lower tension level to favor the prior art embossed belt given that lower belt tensions tend to yield lower tape tensions.

The magnetic tape in each cartridge was driven, starting from about the mid-tape position, at an acceleration level of about 3,000 in/sec$^2$ (7,600 cm/sec$^2$) to various constant tape transport speeds. Minimum transient tape tension during this period of acceleration was measured as follows:

| Acceleration of 3,000 in/sec to Tape Speed in inches (cm) per sec | Minimum Tape Tension in ounces (newtons) | |
|---|---|---|
| | Standard Belt | Ribbed Belt |
| 90 (229) | 0.50 (0.14) | 1.30 (0.36) |
| 105 (267) | 0.48 (0.13) | 1.38 (0.38) |
| 120 (305) | 0.46 (0.13) | 1.20 (0.33) |
| 135 (343) | 0.00 (—) | 1.05 (0.29) |
| 150 (381) | — | 0.80 (0.22) |

| Acceleration of 3,000 in/sec to Tape Speed in inches (cm) per sec | Minimum Tape Tension in ounces (newtons) | |
| --- | --- | --- |
| | Standard Belt | Ribbed Belt |
| 165 (419) | — | 0.30 (0.08) |
| 180 (457) | — | 0.05 (0.01) |
| 195 (495) | — | 0.00 (—) |

The prior art belt generated a minimum tape tension of only 0.5 ounces (0.14 newtons) for the 3,000 in/sec$^2$ (7,600 cm/sec$^2$) acceleration to 90 in/sec (229 cm/sec), compared with a minimum tension of 1.30 ounces (0.36 newtons) for the ribbed belt. The prior art belt generated a minimum tension of 0 for the 3,000 in/sec$^2$ (7,600 cm/sec) acceleration to speeds 135 in/sec (343 cm/sec) and higher. This condition may lead to tape spilling out from the cartridge and subsequent cartridge destruction. The ribbed belt continued to maintain a minimum tape tension for speeds up to 180 in/sec (457 cm/sec).

Figure 4:
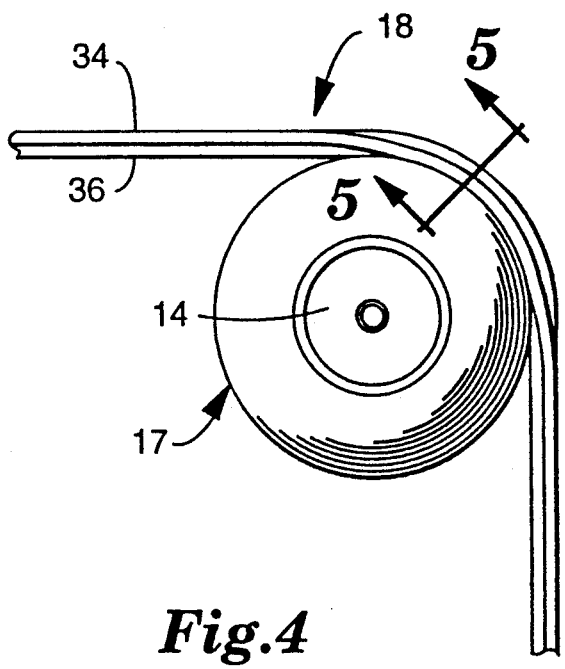
FIG. 4 is a side view of a drive belt according to the present invention tensioned against a tape pack.

Although the present invention has been described with reference to preferred embodiments, workers skilled in the art will recognize that changes may be made in form and detail without departing from the spirit and scope of the invention. For example, while ribs 36 and 42 are shown in FIGS. 2–4 as being rectangular, they may be any shape so long as their presence between the belt and tape pack forms a pair of macroscopic air channels.

I claim:

1. A thin, continuous, flexible drive belt adapted for use in a belt-driven data cartridge including tape pack, a roller, and a drive belt wound around the tape pack and the roller, wherein the belt has a single raised portion which extends longitudinally along the center of the face of the belt that contacts the tape pack.

2. The belt recited in claim 1, wherein the raised portion comprises a rectangular rib.

3. The belt recited in claim 1, wherein the width of the raised portion is about one-third of the width of the face of the belt.

4. The belt recited in claim 1, wherein the belt comprises polyurethane.

5. A pair of thin, continuous, flexible drive belts adapted for use in a belt-driven data cartridge including a tape pack, a roller, and a drive belt wound around the tape pack and the roller, wherein the first belt is narrower than the second belt and extends longitudinally along the center of the face of the second belt that contacts the tape pack.

6. The pair of belts recited in claim 5, wherein the width of the face of the first belt is about one-third of the width of the face of the second belt.

7. The pair of belts recited in claim 5, wherein the belts comprise polyurethane.

8. A belt-driven tape pack comprising:
a belt drive roller;
a pair of belt guide rollers;
a pair of hubs on which is wound a length of magnetic tape, thereby forming a tape pack; and
a drive belt entrained around the drive roller, the pair of guide rollers, and the tape pack, whereby rotation of the drive roller causes the drive belt to transfer the magnetic tape from one hub to the other, wherein the belt has a single raised portion which extends longitudinally along the center of the face of the belt that contacts the tape pack.

9. The belt-drive tape pack recited in claim 8, wherein the raised portion of the belt comprises a rectangular rib.

10. The belt-driven tape pack recited in claim 8, wherein the width of the raised portion of the belt is about one-third of the width of the face of the belt.

11. The belt-drive tape pack recited in claim 8, wherein the belt comprises polyurethane.

12. A belt-driven tape pack comprising:
a belt drive roller;
a pair of belt guide rollers;
a pair of hubs on which is wound a length of magnetic tape, thereby forming a tape pack; and
a first and second drive belt entrained around the drive roller, the pair of guide rollers, and the tape pack, whereby rotation of the drive roller causes the drive belts to transfer the magnetic tape from one hub to the other, wherein the first belt is narrower than the second belt and extends longitudinally along the center of the face of the second belt that contacts the tape pack.

13. The pair of belts recited in claim 12, wherein the width of the face of the first belt is about one-third of the width of the face of the second belt.

14. The pair of belts recited in claim 12, wherein the belts comprise polyurethane.

* * * * *